United States Patent [19]
Chirdon

[11] Patent Number: 5,406,054
[45] Date of Patent: Apr. 11, 1995

[54] HEATED SIMULATED ROCK FOR TERRARIUM

[76] Inventor: Raymond Chirdon, 905 Main St., Apartment 3, East Rochester, N.Y. 14445

[21] Appl. No.: 207,601

[22] Filed: Mar. 9, 1994

[51] Int. Cl.⁶ .............................................. H05B 3/18
[52] U.S. Cl. ..................................... 219/521; 219/201; 219/386
[58] Field of Search ............... 219/521, 385, 386, 200, 219/201, 217

[56] References Cited
U.S. PATENT DOCUMENTS

| | | | |
|---|---|---|---|
| 4,234,780 | 11/1980 | McCarthy | 219/200 |
| 4,771,563 | 9/1988 | Easley | 43/1 |
| 5,261,352 | 11/1993 | Stammelman | 119/28.5 |
| 5,272,316 | 12/1993 | Chesnut | 219/385 |

*Primary Examiner*—Teresa J. Walberg
*Attorney, Agent, or Firm*—H. Jay Spiegel

[57] ABSTRACT

A simulated rock includes a heating chamber containing a self-contained battery operated heater. Heating coils extend throughout the body of the simulated rock to heat its surfaces. The heating chamber is accessible through a removable lid and the simulated rock has an internal chamber providing safe shelter for an animal.

6 Claims, 2 Drawing Sheets

HEATED SIMULATED ROCK FOR TERRARIUM

BACKGROUND OF THE INVENTION

The present invention relates to a heated simulated rock for terrarium. In the prior art, it is known to provide a simulated heated rock for a terrarium. However, Applicant is unaware of any such device which includes all of the features and aspects of Applicant's invention.

In particular, Applicant is unaware of any such device which is completely self-contained not requiring any electrical cord. Commercially available heated simulated rocks are electrically powered using a cord which extends out of the terrarium. Animals routinely climb up the cord to escape. Furthermore, animals also chew on the cord causing danger of electrocution as well as creating potential and actual fire hazards. As such, a need has developed for such a device which does not provide such dangers of fire and electrocution.

In a further aspect, Applicant is unaware of any such device which provides the combination of a self-contained power supply with the provision of a chamber within the simulated rock designed to provide shelter and safety for an animal.

SUMMARY OF THE INVENTION

The present invention relates to a heated simulated rock for terrarium. The present invention includes the following interrelated objects, aspects and features:

(A) In a first aspect, the inventive simulated rock includes a base portion, a body and an upper portion.

(B) The upper portion includes a top which, when removed, reveals an internal chamber in the simulated rock body, which chamber contains at least one battery and a heater mechanism. In the preferred embodiment, at least one heating coil is provided in the body of the simulated rock which is electrically connected to the heater mechanism to heat the entire body of the rock so that it is warm to the touch.

(C) In the body of the simulated rock, an internal chamber is provided which includes at least one side opening sized to permit a small animal to enter the chamber for security and warmth.

(D) The inventive simulated rock may be made of any suitable materials such as masonry, molded plastic, wood, or the like. In the preferred embodiment, the outer surface of the simulated rock may be decorated in different colors to render the simulated rock aesthetically pleasing.

As such, it is a first object of the present invention to provide a heated simulated rock for terrarium.

It is a further object of the present invention to provide such a device including a chamber containing a self-contained heater element.

It is a yet further object of the present invention to provide such a device including at least one heating coil extending through the body thereof and being electrically connected to the heater mechanism.

It is a still further object of the present invention to provide such a device including a chamber designed to provide warmth and security to an animal.

These and other objects, aspects and features of the present invention will be better understood from the following detailed description of the preferred embodiment when read in conjunction with the appended drawing Figure.

SPECIFIC DESCRIPTION OF THE PREFERRED EMBODIMENT

Figure 1:
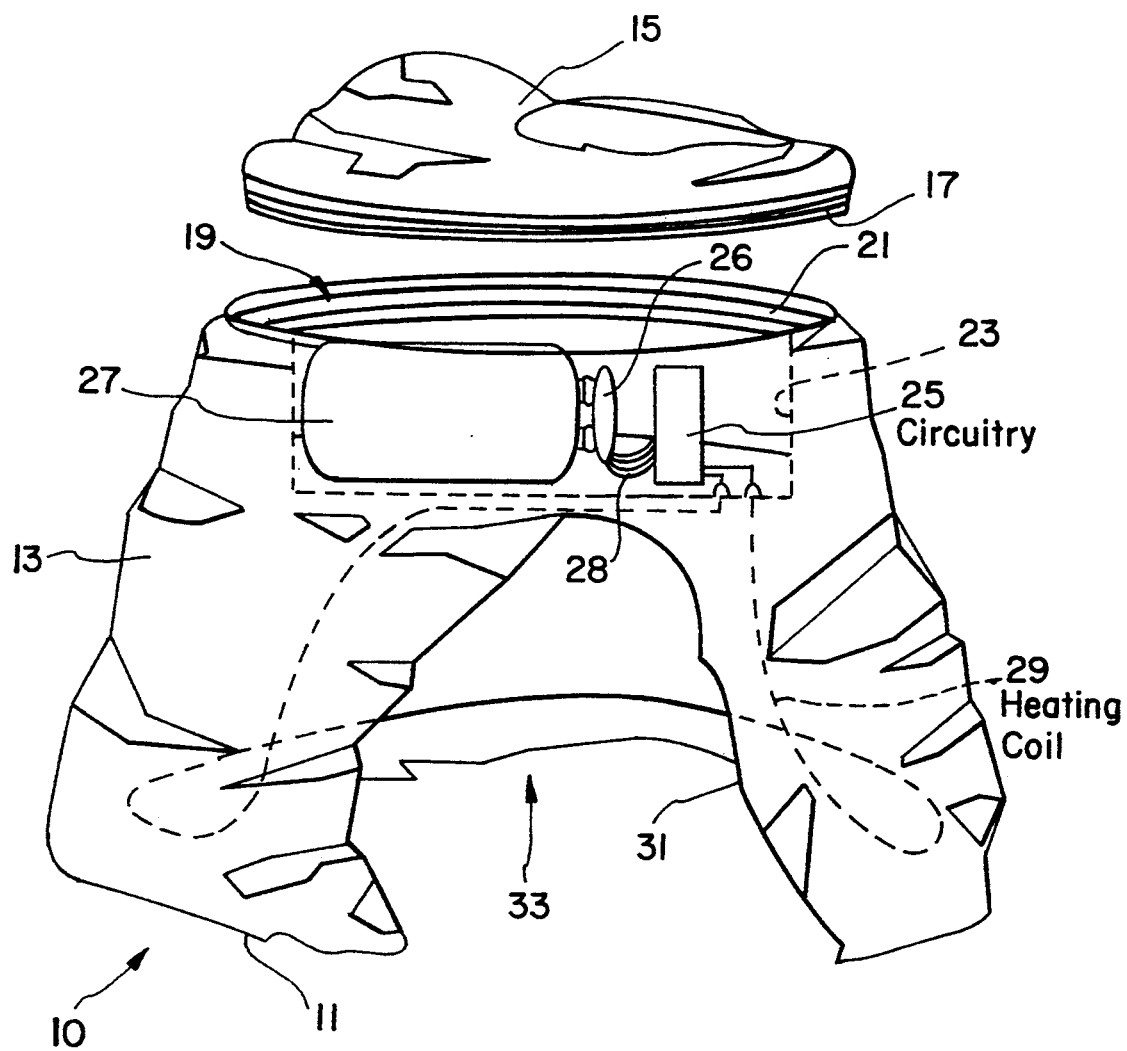
FIG. 1 shows a perspective view, partially exploded, of the present invention, with certain portions shown in phantom to show detail.

With reference to FIG. 1, the inventive heated simulated rock is generally designated by the reference numeral 10 and is seen to include a base 11 having a bottom surface, a body portion 13 and an upper portion having a top 15 shown as having peripheral threads 17 designed to enmesh with the internal threads 21 of an opening 19 at the upper portion of the body 13.

As shown, partially in phantom, the opening 19 leads to an internal chamber 23 which contains circuitry 25 for an electric heater 29 powered by at least one battery 27 contained within the chamber 23.

. As shown in phantom, in FIG. 1 the other portion of the heater may include heating coils 29 which extend within the body portion 13 of the inventive heated simulated rock 10 to convey heat from the heater 29 throughout the body 13 thereof. In the preferred embodiment of the present invention, the combination of the circuitry 25 and the coil 29 comprises a radiant-type heater with the coil 29 being embedded within the body portion 13 of the rock 10 at the time of manufacture. In this regard, the simulated rock 10 is preferably made of a molded plastic molded with the heating coil 29 embedded therein at the time of manufacture. Alternatively, a chemical-type heater could be employed contained within the chamber 23.

With further reference to FIG. 1, the body portion 13 has an opening 31 which leads to an internal chamber 33 defined by the walls of the body portion 13 as shown in the sole FIGURE. The chamber 33 provides security and warmth to a small animal contained therein.

Figure 2:
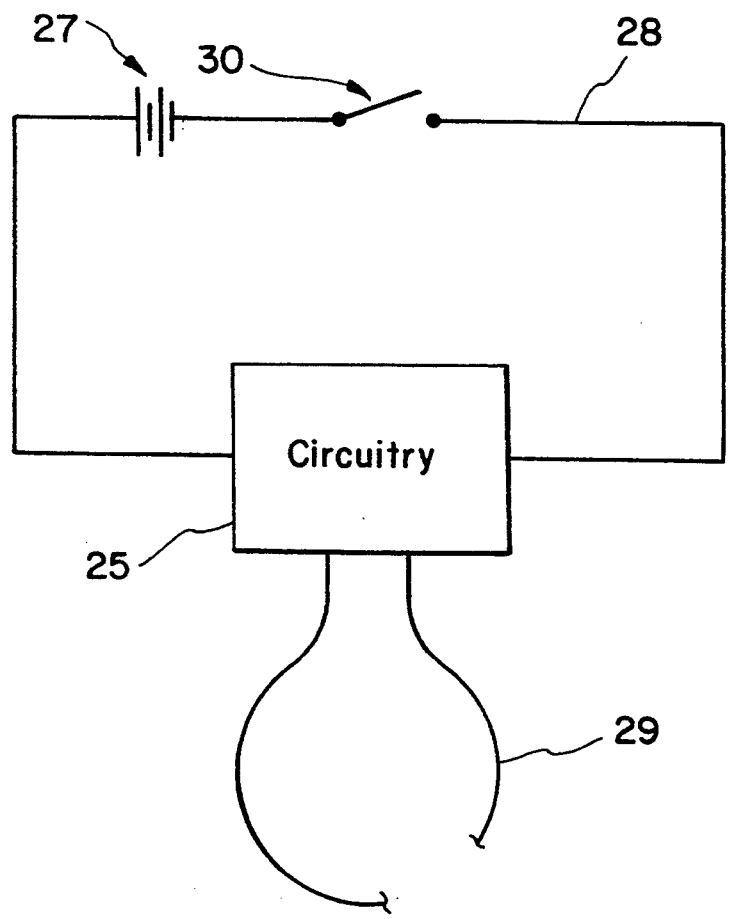
FIG. 2 shows a schematic representation of the electrical circuitry of the present invention.

In the preferred embodiment of the present invention, the inventive heated simulated rock 10 is placed within a terrarium where small animals including lizards and-/or insects and arachnids are contained. At least one battery 27 or a plurality of such batteries, if desired, is/are contained within the chamber 19 electrically connected (FIG. 2) to the circuitry 25 by virtue of an electrical coupling 26 and the electrical conductors 28 as shown. If desired, an on-off switch 30 (FIG. 2) may be interposed within the electrical conductor 28 between the battery 27 and the heater circuitry 25 so that activation and de-activation of the heater circuitry 25 may be suitably controlled. In any case, with the heater circuitry 25 activated, the top 15 is placed over the opening 19 and the enmeshing of the threads 17, 21 through rotation of the top 15 with respect to the body portion 13 causes the top 15 to be fastened in the opening 19 to seal the chamber 23.

In this way, the inventive device 10 is completely self-contained with no electrical conductors extending therefrom which could provide (1) danger to the animals contained within the associated terrarium as well as (2) a means for climbing out of the terrarium.

Accordingly, an invention has been disclosed in terms of a preferred embodiment thereof which fulfills each and every one of the objects of the present invention as set forth hereinabove and provides a new and useful heated simulated rock for terrarium of great novelty and utility.

Of course, various changes, modifications and alterations in the teachings of the present invention may be contemplated by those skilled in the art without departing from the intended spirit and scope thereof.

As such, it is intended that the present invention only be limited by the terms of the appended claims.

I claim:

1. A heated simulated rock, comprising:
    a) a body having a bottom surface adapted to sit on a floor, a body portion made to resemble a rock and an upper portion;
    b) a first opening in said upper portion leading to a first chamber in said body, said chamber containing a self-contained heater for heating said body;
    c) a top sized and configured to removably seal said opening; and
    d) a second opening in said body portion leading to a second chamber in said body below said first chamber and adapted to provide shelter to an animal entering said second chamber.

2. The heated simulated rock of claim 1, wherein said heater is an electrical heater including at least one battery contained within said first chamber.

3. The heated simulated rock of claim 2, wherein said body has at least one heating coil embedded therein and forming a part of said heater.

4. The heated simulated rock of claim 2, wherein said at least one battery comprises a 9 volt battery.

5. The heated simulated rock of claim 1, wherein said first opening and a periphery of said top are threaded whereby said top may be threadably received in said first opening.

6. The heated simulated rock of claim 1, made of molded plastic.

* * * * *